United States Patent
Tomovic et al.

(10) Patent No.: US 9,334,383 B2
(45) Date of Patent: May 10, 2016

(54) PROCESS FOR PRODUCING RIGID POLYURETHANE FOAMS

(75) Inventors: Zeljko Tomovic, Lemfoerde (DE); Olaf Jacobmeier, Luebbecke (DE); Gunnar Kampf, Stemwede-Haldem (DE)

(73) Assignee: BASF SE, Ludwigshafen (DE)

(*) Notice: Subject to any disclaimer, the term of this patent is extended or adjusted under 35 U.S.C. 154(b) by 356 days.

(21) Appl. No.: 13/438,252

(22) Filed: Apr. 3, 2012

(65) Prior Publication Data

US 2012/0264841 A1 Oct. 18, 2012

Related U.S. Application Data

(60) Provisional application No. 61/475,708, filed on Apr. 15, 2011.

(51) Int. Cl.
| | |
|---|---|
| C08G 18/48 | (2006.01) |
| C08J 9/14 | (2006.01) |
| C08G 18/16 | (2006.01) |
| C08J 9/08 | (2006.01) |
| C08G 18/76 | (2006.01) |
| C08G 18/20 | (2006.01) |
| C08G 18/22 | (2006.01) |
| C08G 101/00 | (2006.01) |

(52) U.S. Cl.
CPC ............... C08J 9/141 (2013.01); C08G 18/16 (2013.01); C08G 18/163 (2013.01); C08G 18/2027 (2013.01); C08G 18/225 (2013.01); C08G 18/482 (2013.01); C08G 18/4825 (2013.01); C08G 18/4829 (2013.01); C08G 18/7664 (2013.01); C08J 9/08 (2013.01); C08G 2101/005 (2013.01); C08G 2101/0025 (2013.01); C08J 2375/08 (2013.01)

(58) Field of Classification Search
CPC .. C08G 18/16; C08G 18/482; C08G 18/4825; C08G 18/4829; C08G 2101/0025; C08J 2375/08; C08J 9/141; C08J 9/08
USPC .................. 521/130, 131, 164, 167, 173, 174
See application file for complete search history.

(56) References Cited

U.S. PATENT DOCUMENTS

| | | | |
|---|---|---|---|
| 4,283,480 A | 8/1981 | Davies et al. | |
| 5,648,019 A * | 7/1997 | White, III | C08G 18/4018 252/182.24 |
| 5,688,835 A | 11/1997 | Scherbel et al. | |
| 5,886,062 A * | 3/1999 | Dietrich et al. | 521/167 |
| 6,114,402 A | 9/2000 | Smith | |
| 6,451,430 B1 | 9/2002 | Smith | |
| 6,495,722 B1 | 12/2002 | Zimmerman et al. | |
| 6,753,357 B2 * | 6/2004 | Kalinowski et al. | 521/130 |
| 8,426,482 B2 * | 4/2013 | Frericks et al. | 521/173 |
| 2002/0120026 A1 | 8/2002 | Schilling et al. | |
| 2007/0208095 A1 | 9/2007 | Moore et al. | |
| 2007/0232712 A1 * | 10/2007 | Emge et al. | 521/176 |
| 2011/0196055 A1 | 8/2011 | Kramer et al. | |
| 2012/0004334 A1 | 1/2012 | Kramer | |
| 2012/0010313 A1 * | 1/2012 | Tomovic et al. | 521/131 |

FOREIGN PATENT DOCUMENTS

| | | |
|---|---|---|
| DE | 198 17 507 A1 | 10/1999 |
| DE | 100 09 649 A1 | 9/2001 |
| DE | 10 2004 044 915 A1 | 3/2006 |
| EP | 0 009 967 A2 | 4/1980 |
| EP | 0 728 783 A1 | 8/1996 |
| EP | 0 826 708 A1 | 3/1998 |
| EP | 1 510 543 A2 | 3/2005 |
| EP | 1 512 707 A2 | 3/2005 |
| EP | 1 632 511 A1 | 3/2006 |
| EP | 2 386 585 A1 | 11/2011 |
| EP | 2 461 022 A1 | 6/2012 |
| JP | 6-100652 A | 4/1994 |
| JP | 2000-281826 A | 10/2000 |
| WO | WO 02/50161 A2 | 6/2002 |
| WO | WO 2005/044889 A1 | 5/2005 |
| WO | WO 2006/108833 A1 | 10/2006 |
| WO | WO 2010/046361 A1 | 4/2010 |
| WO | WO 2010/106067 A1 | 9/2010 |
| WO | WO 2010/111021 A1 | 9/2010 |

OTHER PUBLICATIONS

U.S. Appl. No. 13/443,336, filed Apr. 10, 2012, Tomovic, et al.
International Search Report issued Jul. 24, 2012 in PCT/EP2012/056485 (with English translation of Categories of Cited Documents).
U.S. Appl. No. 13/848,427, filed Mar. 21, 2013, Kampf.
U.S. Appl. No. 13/731,317, filed Dec. 31, 2012, Kampf.
U.S. Appl. No. 13/740,732, filed Jan. 14, 2013, Kampf.
U.S. Appl. No. 14/210,824, filed Mar. 14, 2014, Jacobmeier et al.
U.S. Appl. No. 14/176,366, filed Feb. 10, 2014, Jacobmeier, et al.

* cited by examiner

*Primary Examiner* — John Cooney
(74) *Attorney, Agent, or Firm* — Oblon, McClelland, Maier & Neustadt, L.L.P.

(57) ABSTRACT

A process for producing a rigid polyurethane foam by reacting an organic polyisocyanate with a polyol component containing a compound with at least two hydrogen atoms which are reactive toward isocyanate groups in the presence of a blowing agent, a catalyst, and optionally auxiliaries and additives, wherein the polyol component contains, by weight: 20 to 60 parts of a polyether alcohol having a functionality of 3.5 to 5.5 and a hydroxyl number of from 400 to 550 mg KOH/g; 1 to 20 parts of a polyether alcohol based on an aliphatic amine and having a functionality of 3.5 to 4.5 and a hydroxyl number of 450 to 900 mg KOH/g; 10 to 30 parts of a polyether alcohol and/or aromatic polyester alcohol having functionalities of 1.5 to 3 and a hydroxyl number of from 150 to 450 mg KOH/g; and optionally 1 to 5 parts of water.

3 Claims, No Drawings

PROCESS FOR PRODUCING RIGID POLYURETHANE FOAMS

This patent application claims the benefit of U.S. provisional patent application Ser. No. 61/475,708 filed Apr. 15, 2011 incorporated in its entirety herein by reference.

The invention relates to a process for producing rigid polyurethane foams and to rigid polyurethane foams produced by the process of the invention and also to a polyol component.

Rigid polyurethane foams have been known for a long time and have been described widely. Rigid polyurethane foams are used predominantly for thermal insulation, for example in refrigeration appliances, transport means or buildings and for producing structural elements, in particular sandwich elements.

An important field of use of rigid polyurethane foams is composite elements. The production of composite elements composed of, in particular, metallic covering layers and a core of foams based on isocyanates, usually polyurethane (PUR) or polyisocyanurate (PIR) foams, frequently also referred to as sandwich elements, on continuously operating double belt plants is at present practiced on a large scale. Apart from sandwich elements for coolstore insulation, elements having colored covering layers are becoming ever more important for construction of façades of a variety of buildings. Apart from coated steel sheets, stainless steel sheets, copper sheets or aluminum sheets are used as covering layers.

It is important that the rigid polyurethane foams fill the hollow spaces uniformly and without voids, so that very good bonding to the covering layers gives a stable construction which ensures good thermal insulation. To prevent foam defects, the foamable PU reaction mixture has to be introduced within a short time into the hollow space to be insulated. Low-pressure or preferably high-pressure machines are usually used for filling such articles with foam.

A summary overview of the production of rigid polyurethane foams and their use as covering layer or core layer in composite elements and also their use as insulating layer in refrigeration or heating engineering may be found, for example, in "Polyurethane", Kunststoff-Handbuch, volume 7, 3rd edition 1993, edited by Dr. Günter Oertel, Carl-Hanser-Verlag, Munich/Vienna.

Suitable rigid polyurethane foams can be produced in a known manner by reacting organic polyisocyanates with one or more compounds having at least two reactive hydrogen atoms in the presence of blowing agents, catalysts and optionally auxiliaries and/or additives.

As compounds having at least two hydrogen atoms which are reactive toward isocyanate groups, preference is given to using polyether alcohols and/or polyester alcohols for producing the polyurethanes. The choice of polyols is made, in particular, on the basis of costs and the desired use properties (e.g. EP-A 1 632 511, U.S. Pat. No. 6,495,722, WO 2006/108833).

However, the surface properties of the known rigid polyurethane foams are still capable of improvement, especially in the production of composite elements since these properties have a substantial influence on the adhesion of the covering layers to the foam. In the production of foams by the spray foam process, too, a good surface is of great importance.

The documents EP 0 728 783 A1, EP 0 826 708 A1 and WO 2010/106067 A1 describe processes for producing rigid PU foams, in which the polyol component comprises castor oil. Castor oil can be advantageous for the surface properties of the foam. On the other hand, castor oil can in the presence of water lead, due to phase separation, to instability of the polyol component, which can lead to problems in processing. Water is frequently used as inexpensive and environmentally friendly blowing agent in the polyol component. A disadvantage of the process described in EP 0 826 708 A1 is the high viscosity of the polyol component and also the very poor adhesion of the rigid PU foams formed. The rigid PU foams produced by the process described in EP 0 728 783 A1 are also capable of improvement in respect of their surface properties and adhesion. The rigid PU foams produced as described in WO 2010/106067 A1 display good adhesion and a good surface, but are still capable of improvement in respect of the storage stability of the polyol component in the case of relatively large amounts of water (>1.5 parts by weight).

It is therefore an object of the invention to develop a process for producing rigid polyurethane foams which leads to foams having good adhesion, good curing and surface quality and whose polyol component has good storage stability and thus good processing properties.

The object has surprisingly been able to be achieved by a process for producing rigid polyurethane foams by reacting
a) organic polyisocyanates with
b) compounds having at least two hydrogen atoms which are reactive toward isocyanate groups in the presence of
c) blowing agents,
d) catalysts and optionally
e) auxiliaries and additives,
wherein a mixture of
b1) from 20 to 60 parts by weight of one or more high-functionality polyether alcohols having functionalities of from 3.5 to 5.5 and a hydroxyl number of from 400 to 550 mg KOH/g,
b2) from 1 to 20 parts by weight of one or more polyether alcohols based on aliphatic amines and having functionalities of from 3.5 to 4.5 and a hydroxyl number of from 450 to 900 mg KOH/g,
b3) from 10 to 30 parts by weight of one or more polyether alcohols and/or aromatic polyester alcohols having functionalities of from 1.5 to 3 and a hydroxyl number of from 150 to 450 mg KOH/g, and
b4) optionally from 1 to 5 parts by weight of water
is used as component b).

The total parts by weight b1) to b4) of the polyol component b) by definition do not exceed 100 parts by weight. The polyol component b) can also comprise catalysts, stabilizers and customary auxiliaries and additives.

The hydroxyl number is determined in accordance with DIN 53240.

The invention further provides the polyol component b) comprising a mixture of
b1) from 20 to 60 parts by weight of one or more high-functionality polyether alcohols having functionalities of from 3.5 to 5.5 and a hydroxyl number of from 400 to 550 mg KOH/g,
b2) from 1 to 20 parts by weight of one or more polyether alcohols based on aliphatic amines and having functionalities of from 3.5 to 4.5 and a hydroxyl number of from 450 to 900 mg KOH/g,
b3) from 10 to 30 parts by weight of one or more polyether alcohols and/or aromatic polyester alcohols having functionalities of from 1.5 to 3 and a hydroxyl number of from 150 to 450 mg KOH/g, and
b4) optionally from 1 to 5 parts by weight of water.

As regards the individual components used in the process of the invention and for the polyol component b) of the invention, the following may be said:

a) Possible organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, e.g. cyclohexane 1,3- and 1,4-diisocyanate and also any mixtures of these isomers, 1-isocyanato-3,3,5-trimethyl-5-isocyanatomethylcyclohexane(isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Mention may be made by way of example of diisocyanates and/or polyisocyanates comprising ester, urea, biuret, allophanate, carbodiimide, isocyanurate, uretdione and/or urethane groups.

Specific examples are: organic, preferably aromatic polyisocyanates comprising urethane groups and having NCO contents of from 33.6 to 15% by weight, preferably from 31 to 21% by weight, based on the total weight, for example reaction products of low molecular weight diols, triols, dialkylene glycols, trialkylene glycols or polyoxyalkylene glycols, and having molecular weights up to 6000, in particular molecular weights up to 1500, modified diphenylmethane 4,4'-diisocyanate, modified diphenylmethane 4,4'- and 2,4'-diisocyanate mixtures or modified crude MDI or tolylene 2,4- or 2,6-diisocyanate, with examples of dialkylene glycols or polyoxyalkylene glycols, which can be used individually or as mixtures, being: diethylene glycol, dipropylene glycol, polyoxyethylene, polyoxypropylene and polyoxypropylene-polyoxyethylene glycols, triols and/or tetrols. Also suitable are prepolymers comprising NCO groups and having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or crude MDI.

Liquid polyisocyanates comprising carbodiimide groups and/or isocyanurate rings and having NCO contents of from 33.6 to 15% by weight, preferably from 31 to 21% by weight, based on the total weight, e.g. compounds based on diphenylmethane 4,4'-, 2,4'- and/or 2,2'-diisocyanate and/or tolylene 2,4- and/or 2,6-diisocyanate, have also been found to be useful.

The modified polyisocyanates can optionally be mixed with one another or with unmodified organic polyisocyanates such as diphenylmethane 2,4'-, 4,4'-diisocyanate, crude MDI, tolylene 2,4- and/or 2,6-diisocyanate.

The following polyisocyanates have been found to be particularly useful and are preferably employed: mixtures of tolylene diisocyanates and crude MDI or mixtures of modified organic polyisocyanates comprising urethane groups and having an NCO content of from 33.6 to 15% by weight, in particular ones based on tolylene diisocyanates, diphenylmethane 4,4'-diisocyanate, diphenylmethane diisocyanate isomer mixtures or crude MDI and in particular crude MDI having a diphenylmethane diisocyanate isomer content of from 25 to 80% by weight, preferably from 30 to 55% by weight.

b) The polyether polyols b1), b2) and b3) used are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule comprising from 2 to 8, preferably from 2 to 6, reactive hydrogen atoms in bound form or by cationic polymerization using Lewis acids such as antimony pentachloride, boron fluoride etherate, etc. or bleaching earth as catalysts. It is also possible to use multimetal cyanide compounds, known as DMC catalysts. Tertiary amines such as triethylamine, tributylamine, trimethylamine, dimethylethanolamine and/or dimethylcyclohexylamine can also be used as catalyst.

Suitable alkylene oxides for preparing the polyether polyols b1), b2) and b3) are, for example, ethylene oxide, 1,2-propylene oxide, 1,3-propylene oxide, 1,2- or 2,3-butylene oxide, tetrahydrofuran, styrene oxide, preferably ethylene oxide and 1,2-propylene oxide. The alkylene oxides can be used individually, alternately in succession or as mixtures.

Possible starter molecules for the polyether alcohols b1), b2) and b3) used according to the invention are the following compounds:

b1) Use is made, in particular, of hydroxyl-comprising high-functionality compounds, in particular sugars, starches or lignin, as starter substances. Glucose, sucrose and sorbitol are of particular practical importance here. Since these compounds are present in solid form under the usual reaction conditions of alkoxylation, it is generally customary to alkoxylate these compounds together with coinitiators. Suitable coinitiators are, in particular, water and polyfunctional lower alcohols, e.g. glycerol, trimethylolpropane, pentaerythritol, ethylene glycol, diethylene glycol, propylene glycol and homologues thereof.

b2) Starter molecules used are, in particular, ammonia, polyfunctional aliphatic amines, in particular those having from 2 to 6 carbon atoms and primary and secondary amino groups, and also amino alcohols having from 2 to 6 carbon atoms in the main chain. Preference is given to using ethylenediamine, monoalkylethylenediamines, 1,3-propylenediamine and also various butylenediamines and hexamethylenediamines; and ethanolamine, diethanolamine and triethanolamine as amino alcohols.

b3) Water and/or low molecular weight bifunctional or trifunctional alcohols are used as starter substances. In particular, linear or branched alcohols having from 2 to 12 carbon atoms, especially those having from 2 to 6 carbon atoms, in the main chain are used. Compounds preferably used as starter substances are water and, for example, glycerol, trimethylolpropane, ethylene glycol, propylene glycol, diethylene glycol, dipropylene glycol, 1,4-butanediol, pentaerythritol, 1,6-hexanediol and homologues thereof.

The polyester alcohol b3) is usually prepared by reacting aromatic carboxylic acids and/or derivatives thereof, in particular esters and anhydrides, with alcohols. The carboxylic acids and/or the alcohols, preferably both, are polyfunctional. The aromatic carboxylic acids or anhydrides thereof are, in particular, selected from the group consisting of terephthalic acid, phthalic acid and phthalic anhydride, particularly preferably phthalic anhydride.

The polyester alcohol b3) can also be prepared using esters of aromatic carboxylic acids, in particular those selected from the group consisting of polyethylene terephthalate and dimethyl terephthalate. The polyethylene terephthalate can be a recycling product, in particular from the recycling of beverage bottles.

The polyester alcohol b3) is particularly preferably prepared using mixtures of carboxylic acids and derivatives thereof which comprise at least 50% by weight, based on the weight of the carboxylic acids, of terephthalic acid. In a preferred embodiment of the invention, exclusively terephthalic acid is used as carboxylic acid.

Apart from the abovementioned carboxylic acids and derivatives thereof, it is also possible to use the other known polyfunctional carboxylic acids, for example aliphatic carboxylic acids such as adipic acid and succinic acid. However, their content should be less than 50% by weight, based on the weight of the carboxylic acids.

As further starting materials in the preparation of the polyester alcohols b3), it is also possible to make concomitant use of hydrophobic materials. The hydrophobic materials are water-insoluble materials which comprise a nonpolar organic radical and also have at least one reactive group selected from among hydroxyl, carboxylic acid, carboxylic ester and mixtures thereof. The equivalent weight of the hydrophobic materials is in the range from 130 to 1000 g/mol. It is possible to use, for example, fatty acids such as stearic acid, oleic acid, palmitic acid, lauric acid or linoleic acid and also fats and oils such as castor oil, maize oil, sunflower oil, soybean oil, coconut oil, olive oil or tall oil. If the polyester alcohols comprise hydrophobic materials, the proportion of the hydrophobic materials in the total monomer content of the polyester alcohol is preferably from 1 to 30 mol %, particularly preferably from 4 to 15 mol %.

As alcohols for preparing the polyester alcohols b3), use is usually made of bifunctional alcohols such as (mono)ethylene glycol, diethylene glycol, polyethylene glycol, propylene glycol, 1,3-propanediol, 1,4-butanediol, 1,5-pentanediol, 1,6-hexanediol, 2-methyl-1,3-propanediol, 3-methyl-1,5-pentanediol, but also polyfunctional alcohols such as glycerol, trimethylolpropane, pentaerythritol and alkoxylates thereof, in particular ethoxylates thereof. Preference is given to (mono)ethylene glycol and/or diethylene glycol.

The polyester alcohols b3) used preferably have functionalities of from 1.5 to 2.5 and a hydroxyl number of from 170 to 250 mg KOH/g, particularly preferably functionalities of from 1.7 to 2.3 and a hydroxyl number of from 180 to 220 mg KOH/g.

It is possible to use one or more polyether alcohols and/or aromatic polyester alcohols as b3). Preference is given to using one or more polyether alcohols.

The polyether alcohols b1) preferably have functionalities of from 3.7 to 5.2 and a hydroxyl number of from 400 to 520 mg KOH/g and particularly preferably functionalities of from 3.9 to 5 and a hydroxyl number of from 400 to 500 mg KOH/g and very particularly preferably functionalities of from 4 to 4.5 and a hydroxyl number of from 450 to 500 mg KOH/g.

The proportion of the component b1) is preferably from 30 to 60 parts by weight, particularly preferably from 40 to 60 parts by weight.

The polyether alcohols b2) preferably have a functionality of 4 and a hydroxyl number of from 470 to 800 mg KOH/g and particularly preferably a functionality of 4 and a hydroxyl number of 730-800 mg KOH/g.

The proportion of the component b2) is preferably from 3 to 18 parts by weight, particularly preferably from 5 to 15 parts by weight.

The polyether alcohols b3) preferably have functionalities of from 2 to 3 and a hydroxyl number of 220-430 mg KOH/g.

Particular preference is given to polyether alcohols b3) having a functionality of 3 and a hydroxyl number of 380-420 mg KOH/g.

The proportion of the component b3) is preferably from 10 to 25 parts by weight, particularly preferably from 10 to 20 parts by weight.

Further information regarding the polyether alcohols b1), b2) and b3) used and also their preparation may be found, for example, in Kunststoffhandbuch, volume 7 "Polyurethane", edited by Günter Oertel, Carl-Hanser-Verlag Munich, 3rd edition, 1993.

The component b) can comprise from 1 to 5 parts by weight, in particular from 1.5 to 5 parts by weight and very particularly preferably from 2 to 5 parts by weight, of water b4).

In one embodiment, the proportion of water b4) is from 2 to 5% by weight. This embodiment can be combined with other embodiments of the process of the invention.

The component b) can optionally also comprise chain extenders and/or crosslinkers. As chain extenders and/or crosslinkers, use is made of, in particular, bifunctional or trifunctional amines and alcohols, in particular diols, triols or both, in each case having molecular weights of less than 400, preferably from 60 to 300.

c) As blowing agent for the process of the invention, it is possible to use the blowing agents customary for producing rigid polyurethane foams.

As blowing agents c), it is possible to use water and additionally generally known chemically and/or physically acting compounds. For the purposes of the present invention, chemical blowing agents are compounds which react with isocyanate to form gaseous products, for example water or formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons, and ethers, esters, ketones, acetals and also inorganic and organic compounds which liberate nitrogen on heating, or mixtures thereof, for example (cyclo)aliphatic hydrocarbons having from 4 to 8 carbon atoms or fluorinated hydrocarbons such as 1,1,1,3,3-pentafluoropropane (HFC 245 fa), trifluoromethane, difluoromethane, 1,1,1,3,3-pentafluorobutane (HFC 365 mfc), 1,1,1,2-tetrafluoroethane, difluoroethane and hepta-fluoropropane.

Low-boiling aliphatic hydrocarbons, preferably n-pentane and/or isopentane, in particular n-pentane, are advantageously used as blowing agents.

n-Pentane has a boiling point of 36° C., isopentane a boiling point of 28° C. The boiling points are therefore in a range which is favorable for the blowing process.

Since the aliphatic hydrocarbons which are suitable as blowing agents are flammable and explosive, the foaming plants have to be equipped with the appropriate safety devices as are also necessary when using n-pentane as blowing agent.

It is advantageous to use the aliphatic hydrocarbons together with water as blowing agent. The amount of aliphatic hydrocarbons used is from 2 to 25% by weight, preferably from 5 to 15% by weight, based on the component b). The proportion of water depends on the desired foam density of the rigid polyurethane foam and is generally from 2 to 2.5%.

d) Catalysts (d) used for producing the rigid polyurethane foams are, in particular, compounds which strongly accelerate the reaction of the compounds comprising reactive hydrogen atoms, in particular hydroxyl groups, of the component (b) with the organic, optionally modified polyisocyanates (a).

Suitable catalysts (d) are strongly basic amines, for example amidines such as 2,3-dimethyl-3,4,5,6-tetrahydropyrimidine, tertiary amines such as triethylamine, tributylamine, dimethylcyclohexylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiamino(ethyl ether), bis(2-dimethyl-aminoethyl)ether, bis(dimethylaminopropyl)urea, dimethylpiperazine, 1,2-dimethyl-imidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine, N,N-dimethylaminoethoxyethanol, N,N,N'-trimethylaminoethylethanolamine and dimethylethanolamine.

Further possible catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide and also alkali metal salts of long-chain fatty acids having from 10 to 20 carbon atoms and optionally lateral OH groups.

If isocyanurate groups are to be incorporated into the rigid foam, specific catalysts are required. As isocyanurate catalysts, use is usually made of metal carboxylates, in particular potassium acetate and solutions thereof. The catalysts can, depending on requirements, be used either alone or in any mixtures with one another.

Preference is given to using from 0.001 to 7% by weight, in particular from 0.05 to 5% by weight, of catalyst or catalyst combination, based on the weight of the component (b).

e) Auxiliaries and/or additives (e) can optionally be incorporated into the reaction mixture for producing the rigid polyurethane foams. Mention may be made by way of example of surface-active substances, foam stabilizers, cell regulators, fillers, dyes, pigments, flame retardants, hydrolysis inhibitors, fungistatic and bacteriostatic substances.

Possible surface-active substances are, for example, compounds which serve to aid the homogenization of the starting materials and may also be suitable for regulating the cell structure of the plastics. Mention may be made by way of example of emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic acid or dinaphthylmethanedisulfonic acid and ricinoleic acid; foam stabilizers such as siloxane-oxyalkylene copolymers and other organo-polysiloxanes, ethoxylated alkylphenols, ethoxylated fatty alcohols, paraffin oils, castor oil esters and ricinoleic esters, Turkey red oil and peanut oil and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 5 parts by weight, based on 100 parts by weight of the component (b).

For the purposes of the present invention, fillers, in particular reinforcing fillers, are the customary organic and inorganic fillers, reinforcing materials, weighting agents, agents for improving the abrasion behavior in paints, coating compositions, etc., known per se. Specific examples are: inorganic fillers such as siliceous minerals, for example sheet silicates such as antigorite, serpentine, horn blendes, amphiboles, chrysotile, talc; metal oxides such as kaolin, aluminum oxides, titanium oxides and iron oxides, metal salts such as chalk, barite and inorganic pigments such as cadmium sulfide, zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously incorporated into the reaction mixture in amounts of from 0.5 to 50% by weight, preferably from 1 to 40% by weight, based on the weight of the components (a) and (b), but the content of mats, nonwovens and woven fabrics of natural and synthetic fibers can reach values of up to 80% by weight.

As flame retardants, it is possible to employ organic phosphoric esters and/or phosphonic esters. Preference is given to using compounds which are not reactive toward isocyanate groups. Chlorine-comprising phosphoric esters are also among the preferred compounds. Suitable flame retardants are, for example, tris(2-chloropropyl)phosphate, triethyl phosphate, diphenyl cresyl phosphate, diethyl ethanephosphinate, tricresyl phosphate, tris(2-chloroethyl)phosphate, tris(1,3-dichloropropyl)phosphate, tris(2,3-dibromopropyl) phosphate, tetrakis(2-chloroethyl)ethylene diphosphate, dimethyl methanephosphonate, diethyl diethanolaminomethyiphosphonate and also commercial halogen-comprising flame retardant polyols.

In addition, it is also possible to use bromine-comprising flame retardants. As bromine-comprising flame retardants, preference is given to using compounds which are reactive toward the isocyanate group. Such compounds are, for example, esters of tetrabromophthalic acid with aliphatic diols and alkoxylation products of dibromobutenediol. Compounds derived from the group of brominated neopentyl compounds comprising OH groups can also be employed.

Apart from the abovementioned halogen-substituted phosphates, it is also possible to use inorganic or organic flame retardants such as red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants such as ammonium polyphosphates and melamine and optionally maize starch or ammonium polyphosphate, melamine and expandable graphite and/or aromatic or nonaromatic polyesters for making the polyisocyanate polyaddition products flame resistant. In general, it has been found to be advantageous to use from 5 to 50 parts by weight, preferably from 5 to 25 parts by weight, of the flame retardants mentioned per 100 parts by weight of the component (b).

Further details regarding the abovementioned other customary auxiliaries and additives may be found in the specialist literature, for example the monograph by J. H. Saunders and K. C. Frisch "High Polymers", volume XVI, Polyurethanes, parts 1 and 2, Interscience Publishers 1962 and 1964, or Kunststoff-Handbuch, Polyurethane, volume VII, Hanser-Verlag, Munich, Vienna, 3rd edition, 1993.

To produce the rigid polyurethane foams, the polyisocyanates a) and the polyol component b) are reacted in such amounts that the isocyanate index is in the range from 100 to 150, preferably from 105 to 140, and particularly preferably from 110 to 130. The isocyanate index is the molar ratio of isocyanate groups to groups which are reactive toward isocyanate groups, multiplied by 100.

The rigid foams of the invention are preferably produced on continuously operating double belt plants. Here, the polyol component and the isocyanate component are metered by means of a high-pressure machine and mixed in a mixing head. Catalysts and/or blowing agents can be added to the polyol mixture beforehand by means of separate pumps. The reaction mixture is applied continuously to the lower covering layer. The lower covering layer with the reaction mixture and the upper covering layer run into the double belt. Here, the reaction mixture foams and cures. After leaving the double belt, the continuous strip is cut into the desired dimensions. In this way, it is possible to produce sandwich elements having metallic covering layers or insulation elements having flexible covering layers.

The starting components are mixed at a temperature of from 15 to 90° C., preferably from 20 to 60° C., in particular from 20 to 45° C. The reaction mixture can be cast into closed support tools by means of high- or low-pressure metering machines. Discontinuous sandwich elements, for example, are manufactured by this technology.

The invention further provides rigid polyurethane foams, produced by the process of the invention.

The rigid polyurethane foams produced by the process of the invention have a density of from 0.02 to 0.75 g/cm$^3$, preferably from 0.025 to 0.24 g/cm$^3$ and in particular from 0.03 to 0.1 g/cm$^3$. They are particularly suitable as insulation material in the building and refrigeration sector, e.g. as intermediate layer for sandwich elements or for filling housings of refrigerators and freezer chests with foam.

The rigid PUR foams produced by the process of the invention have good surfaces with few defects and display good adhesion and good curing. The polyol component (b) simultaneously has good storage stability at 20° C. or 5° C. over several months.

The invention is illustrated by the examples below:

COMPARATIVE EXAMPLE 1

A polyol component was produced by mixing 56.0 parts by weight of a polyether alcohol having a hydroxyl number of 490 mg KOH/g and based on propylene oxide and a mixture of sucrose and glycerol as starter, 8.0 parts by weight of a polyether alcohol having a hydroxyl number of 770 mg KOH/g and based on propylene oxide and ethylenediamine as starter, 20 parts by weight of castor oil, 12 parts by weight of tris-2-chloroisopropyl phosphate, 2 parts by weight of Tegostab® B8462 from Goldschmidt, 0.5 part by weight of potassium acetate in ethylene glycol, 50% strength solution, and 2.1 parts by weight of water.

The polyol component is not stable at 20° C. and also at 5° C. and separates into two phases after 24 hours.

COMPARATIVE EXAMPLE 2

A polyol component was produced by mixing 75.4 parts by weight of a polyether alcohol having a hydroxyl number of 490 mg KOH/g and based on propylene oxide and a mixture of sucrose and glycerol as starter, 8.0 parts by weight of a polyether alcohol having a hydroxyl number of 770 mg KOH/g and based on propylene oxide and ethylenediamine as starter, 12 parts by weight of tris-2-chloroisopropyl phosphate, 2 parts by weight of Tegostab® B8462 from Goldschmidt, 0.5 part by weight of potassium acetate in ethylene glycol, 50% strength solution, and 2.1 parts by weight of water.

The polyol component is stable at 20° C. and also at 5° C. This was reacted with a polymeric MDI having an NCO content of 30.9% by weight (Lupranat® M50 from BASF SE) in the presence of n-pentane (6 parts by weight), dimethylcyclohexylamine and water at an isocyanate index of 120. The amounts of dimethylcyclohexylamine and water were selected so that the gel time was 45 seconds and the resulting foam had a density of 36 g/l.

Example 1

A polyol component was produced by mixing 55.4 parts by weight of a polyether alcohol having a hydroxyl number of 490 mg KOH/g and based on propylene oxide and a mixture of sucrose and glycerol as starter, 8.0 parts by weight of a polyether alcohol having a hydroxyl number of 770 mg KOH/g and based on propylene oxide and ethylenediamine as starter, 20 parts by weight of a polyether alcohol having a hydroxyl number of 400 mg KOH/g and based on propylene oxide and glycerol as starter, 12 parts by weight of tris-2-chloroisopropyl phosphate, 2 parts by weight of Tegostab® B8462 from Goldschmidt, 0.5 part by weight of potassium acetate in ethylene glycol, 50% strength solution, and 2.1 parts by weight of water.

The polyol component is stable for several months at 20° C., and also at 5° C. This was reacted with a polymeric MDI having an NCO content of 30.9% by weight (Lupranat® M50 from BASF SE) in the presence of n-pentane (6 parts by weight), dimethylcyclohexylamine and water at an isocyanate index of 120. The amounts of dimethylcyclohexylamine and water were selected so that the gel time was 45 seconds and the resulting foam had a density of 36 g/l.

Example 2

A polyol component was produced by mixing 55.4 parts by weight of a polyether alcohol having a hydroxyl number of 490 mg KOH/g and based on propylene oxide and a mixture of sucrose and glycerol as starter, 8.0 parts by weight of a polyether alcohol having a hydroxyl number of 770 mg KOH/g and based on propylene oxide and ethylenediamine as starter, 10 parts by weight of a polyether alcohol having a hydroxyl number of 400 mg KOH/g and based on propylene oxide and glycerol as starter, 10 parts by weight of a polyester alcohol having a hydroxyl number of 210 mg KOH/g and produced by reacting phthalic anhydride, oleic acid, diethylene glycol and monoethylene glycol, 12 parts by weight of tris-2-chloroisopropyl phosphate, 2 parts by weight of Tegostab® B8462 from Goldschmidt, 0.5 part by weight of potassium acetate in ethylene glycol, 50% strength solution, and 2.1 parts by weight of water.

The polyol component is stable for months at 20° C., and also at 5° C. This was reacted with a polymeric MDI having an NCO content of 30.9% by weight (Lupranat® M50 from BASF SE) in the presence of n-pentane (6 parts by weight), dimethylcyclohexylamine and water at an isocyanate index of 120. The amounts of dimethylcyclohexylamine and water were selected so that the gel time was 45 seconds and the resulting foam had a density of 36 g/l.

Curing of the PU foams produced was determined by means of the indenter test. For this purpose, a steel indenter having a hemispherical end having a radius of 10 mm was pressed to a depth of 10 mm into the foam formed by means of a tensile/compressive testing machine at 3, 4, 5 and 6 minutes after mixing of the components in a polystyrene cup. The maximum force required in N is a measure of the curing of the foam. The sum of curing after 3, 4, 5 and 6 minutes is reported.

For the adhesion experiments, sandwich elements (200×200×80 mm) having metallic covering layers were foamed in the laboratory in a closed heated mold. The temperature of the mold was 40° C. and the total density of the foam was 36 g/l. After curing of the system, test specimens having dimensions of 100×100×80 mm were sawn and the adhesion of the foam to the covering layer (tensile strength in Table 1) was determined in accordance with DIN EN ISO 527-1/DIN 53292.

The frequency of surface defects was determined quantitatively by an optical method. For this purpose, a foam specimen was cut down to a plane one millimeter from the lower covering layer, i.e. the covering layer to which the polyurethane reaction solution had been applied in the double belt process.

In the quantitative assessment of the surface, the surface of the foam was illuminated from the right and then from the left and in each case photographed. The images were superimposed and analyzed by means of image analysis software. The defects on the surface appear as black areas. The percentage of the black areas based on the total surface area is a measure of the frequency of surface defects in the foam.

Furthermore, an additional qualitative assessment of the nature of the surface of the foams was carried out by removing the covering layer from a 1 m×2 m foam specimen and visually assessing the surface.

The results are shown in Table 1.

TABLE 1

|  | Comparative example 1 | Comparative example 2 | Example 1 | Example 2 |
|---|---|---|---|---|
| Stability of the polyol component at 20° C. | unstable | stable | stable | stable |
| Stability of the polyol component at 5° C. | unstable | stable | stable | stable |
| Total curing after 3, 4, 5 and 6 min [N] |  | 344 | 352 | 340 |
| Tensile strength [N/mm²] |  | 0.22 | 0.32 | 0.29 |
| Surface (qualitative) |  | poor | very good | very good |
| Surface (quantitative) [%] |  | 9.1 | 0.7 | 1.2 |

The results in Table 1 show that the stability of the polyol component is good at 20° C. and 5° C. and the surface properties, the curing and the adhesion of the foams produced by the process of the invention are very good.

The storage stability of the polyol components used in the process of the invention is very good; polyol components corresponding to examples 1 and 2, which each comprise 5 parts by weight of water, are even stable for months at 20° C. and also at 5° C.

The PU foams obtained according to comparative example 2 have a significantly lower tensile strength and a poorer surface.

The invention claimed is:

1. A polyol component b), consisting of:
   based on 100 parts by weight of the polyol component b),
   b1) from 20 to 60 parts by weight of at least one high-functionality polyether alcohol based on a hydroxyl-comprising compound and having functionality of from 3.5 to 5.5 and a hydroxyl number of from 400 to 550 mg KOH/g,
   b2) from 5 to 15 parts by weight of at least one polyether alcohol based on an aliphatic amine and having functionality of 4 and a hydroxyl number of from 470 to 800 mg KOH/g,
   b3) from 10 to 30 parts by weight of at least one polyether alcohol having functionality of from 2 to 3 and a hydroxyl number of from 220 to 430 mg KOH/g, and
   b4) optionally, from 1 to 5 parts by weight of water.

2. The polyol component b) according to claim 1, wherein the polyether alcohol b2) has a hydroxyl number of from 730 to 800 mg KOH/g.

3. The polyol component b) according to claim 1, wherein the component b3) is a polyether alcohol having functionality of 3 and a hydroxyl number of from 380 to 420 mg KOH/g.

* * * * *